Figure 1:
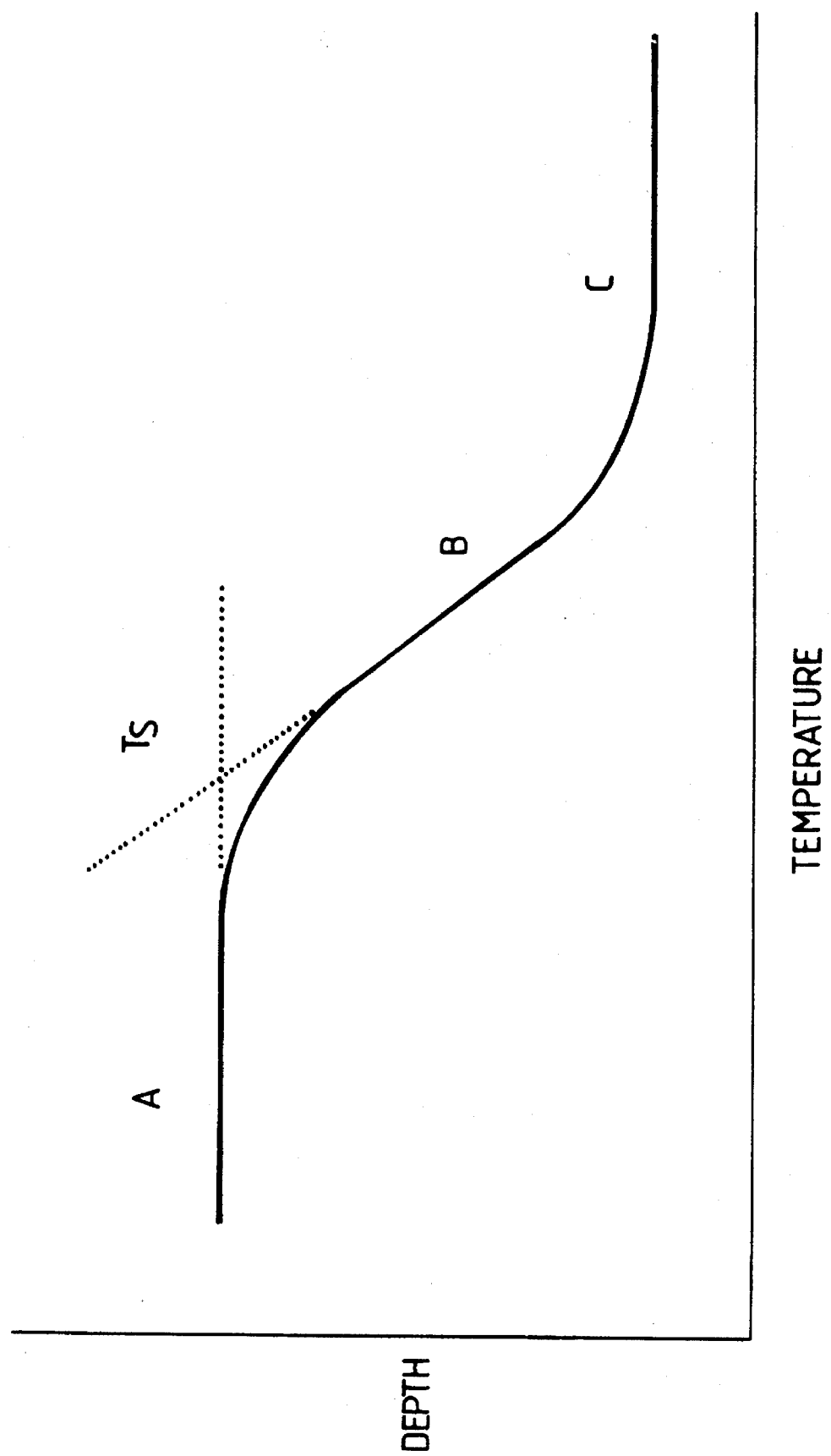

United States Patent [19]

Hammond et al.

[11] Patent Number: 5,618,882
[45] Date of Patent: Apr. 8, 1997

[54] GELS CONTAINING SEPS BLOCK POLYMERS

[75] Inventors: Philip J. Hammond, Wotton Bassett; John M. Hudson, Swindon, both of England; Hendrik Graulus, Sunnyvale, Calif.

[73] Assignee: Raychem Limited, Swindon, United Kingdom

[21] Appl. No.: 335,784

[22] PCT Filed: May 10, 1993

[86] PCT No.: PCT/GB93/00953

§ 371 Date: Nov. 14, 1994

§ 102(e) Date: Nov. 14, 1994

[87] PCT Pub. No.: WO93/23472

PCT Pub. Date: Nov. 25, 1993

[30] Foreign Application Priority Data

May 13, 1992 [GB] United Kingdom ............... 9210291
Jul. 7, 1992 [GB] United Kingdom ............... 9214425

[51] Int. Cl.⁶ ........................... C08L 25/10; C08L 71/12
[52] U.S. Cl. ................. 525/92 D; 524/505; 524/508; 524/571; 524/575; 524/474; 524/476; 525/89
[58] Field of Search ........................... 524/505, 508, 524/571, 575, 474, 476; 525/89, 92 D

[56] References Cited

U.S. PATENT DOCUMENTS

| | | | |
|---|---|---|---|
| 3,827,999 | 8/1974 | Crossland | 524/500 |
| 4,369,284 | 1/1993 | Chen | 524/476 |
| 4,618,213 | 10/1986 | Chen | 350/96.34 |
| 5,093,422 | 3/1992 | Himes | 525/98 |
| 5,210,147 | 5/1993 | Southwick et al. | 525/98 |
| 5,418,052 | 5/1995 | Sugie et al. | 524/505 |

FOREIGN PATENT DOCUMENTS

| | | |
|---|---|---|
| 0188078A1 | 7/1986 | European Pat. Off. . |
| 0260873A3 | 3/1988 | European Pat. Off. . |
| 0299718A2 | 1/1989 | European Pat. Off. . |
| 0362850A2 | 4/1990 | European Pat. Off. . |
| 0371641A1 | 6/1990 | European Pat. Off. . |
| 2625064 | 6/1989 | France . |
| 2167764 | 6/1986 | United Kingdom . |
| 2168991 | 7/1986 | United Kingdom . |
| WO88/00603 | 1/1988 | WIPO . |
| WO90/05401 | 5/1990 | WIPO . |
| WO91/05014 | 4/1991 | WIPO . |

OTHER PUBLICATIONS

Database WPI, Week 9215, Derwent Publs. Ltd., London, GB; AN 92-120235 & JP A, 4 063 887 (Modern Plas Kogyo) 28 Feb. 1992.
Database WPI, Week 9244, Derwent Publs Ltd., London, GB; AN 92-360928 & JP, A 4 261 450 (Mitsui Toatsu Chem.) 17 Sep. 1992.
Patent Abstracts of Japan vol. 15, No. 392 (C-0873) 4 Oct. 1991 & JP, A 31 60 083 (Kanebo) 10 Jul. 1991.
Database WPI Week 9202, Derwent Publs. Ltd., London, GB; AN 92-011383 & JP A, 3 259 955 (Kuraray K.K.) 20 Nov. 1991I.

Primary Examiner—Thomas Hamilton, III
Attorney, Agent, or Firm—Herbert G. Burkard; Yuan Chao

[57] ABSTRACT

Gel compositions comprising styrene-(ethylene/propylene)styrene (SEPS) block copolymer having Mw of at least 180,000 and polystyrene content of 25–45 weight percent, and at least 300 parts by weight percent, and at least 300 parts by weight of extender liquid per 100 parts by weight of the block copolymer. The extender softens the ethylene/propylene mid-blocks of the copolymer and the resulting gels have unexpectedly higher tack, temperature resistance, and extender-retaining ability than corresponding gels made with styrene(ethylene/butylene)-styrene block copolymers.

19 Claims, 1 Drawing Sheet

GELS CONTAINING SEPS BLOCK POLYMERS

This invention provides new and technically superior gel compositions comprising a styrene-(ethylene/propylene)-styrene (SEPS) block copolymer and at least 300 parts by weight (preferably at least 400 parts by weight, more preferably at least 500 parts by weight) of mender liquid per 100 parts by weight of the block copolymer, which liquid extends and softens the ethylene/propylene polymer blocks of the said copolymer. These proportions of extender can alternatively be expressed as percentages by weight of the copolymer, thus: 300=25%, 400=20%, 500=17%.

Known gels made from styrene-(ethylene/butylene)-styrene (SEBS) block copolymers, and test methods for defining and characterising gels, are described in WO-A-8800603 and WO-A-9005166, the disclosures of which are incorporated herein by reference.

Gels according to the present invention, however, made of SEPS copolymer having weight average molecular weight Mw of at least 180,000, preferably at least 200,000, more preferably at least 220,000, and polystyrene content of 25–45 weight percent, preferably 28–40 weight percent, more preferably 29 to 36 weight percent, and made with substantially non-aromatic extender liquid, tend to have improved high-temperature performance and improved ability to retain the extender liquid when subjected to pressure in various end uses. The SEPS gels of this invention also tend to have higher tack than the known SEBS gels, thus reducing the need for added tackifiers to achieve a desired level of adhesion to surfaces with which they are in contact in end use.

The SEPS gels are preferably soft, high-temperature-slump-resistant, springy gel compositions, by which is meant liquid-extended polymer compositions having an ultimate elongation (measured by ASTM D412 modified as described below) greater than 100%, with substantially elastic deformation (i.e. substantially no hysteresis) to an elongation of at least 100%; ultimate tensile strength (ASTM D412) less than 1 MegaPascal; dynamic storage modulus (as hereinafter described) less than 50000 Pascals; and substantially zero slump at temperatures up to 100° C., preferably up to 120° C., more preferably up to 135° C., and especially up to 150° C.

The invention for some end purposes is more particularly concerned with such gel compositions comprising from 4% to 20% by weight of the SEPS copolymer and at least 500 parts by weight of extender liquid per 100 parts by weight of the polymer, in which the SEPS copolymer comprises more than 50%, preferably more than 75%, more preferably more than 90%, and especially more than 95%, by weight, or substantially all, of the total gelling polymer present. Various additives may be present, for example the tackifiers described in WO-A-9005166 or the polyphenylene oxide described in WO-A-8800603, or styrene-alkylene di-block copolymers for reducing the loss of extender liquid as described in our co-pending British Application 9119261.7. However, the superior performance of the present SEPS gels may reduce or eliminate the need for such additives.

The SEPS gels, with which the present invention is concerned, are well suited, inter alia, for re-enterable sealing of electrical connection enclosures. In these and other uses, the gels are subjected to continuous pressure, in view of which their ability to retain the extender liquid is important.

The composition may be "substantially free of" polystyrene-compatible components which significantly raise or lower the softening temperature (Ts) of the composition, either in the sense that substantially no such components are present, or in the sense that the quantities of such components which are present are not sufficient to produce a significant effect on the softening temperature. The use of such components significantly to raise the softening temperature (Ts) is claimed in the aforementioned WO-A-8800603 and may be used in the present case. Lowering of Ts is generally undesirable for the present purposes, and the extender oil will therefore preferably be substantially non-aromatic, meaning that it contains less than 2%, more preferably less than 1%, and especially substantially zero, aromatic material.

Owing to their higher softening temperatures, it is found that SEPS gels according to the present invention provide improvements in slump-resistance at elevated temperatures compared with similar SEBS gels, while still achieving desirable "softness" and "springiness". Slumping usually occurs some tens of degrees above the onset of softening temperature Ts. The present gels are thus clearly distinguished from known cable-filling materials which are designed to slump and flow in use.

Even at high levels of extender liquid, the compositions of this invention remain substantially stable, homogeneous, and relatively free from exudation of extender, and various properties are improved while maintaining an adequate balance of other properties. The gel compositions when adhered to another surface, or to themselves, tend to be removable cleanly by adhesive release at the contact interface, substantially without any cohesive failure within the body of the gel composition.

Especially interesting SEPS block copolymers for the purposes of this invention are those wherein the copolymer comprises 25 to 45 weight percent, preferably 28 to 40 weight percent, especially 29 to 36 weight percent, of the polystyrene blocks.

The block copolymer preferably comprises 75 to 55 weight percent, more preferably 72 to 60 weight percent, especially 71 to 64 weight percent, of the polyalkylene blocks. The polyalkylene blocks preferably comprise substantially fully hydrogenated poly(ethylene/propylene) blocks, especially those predominantly (e.g. >90% or >95%) comprising units of formula

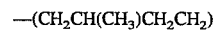

possibly with small amounts of isomers such as

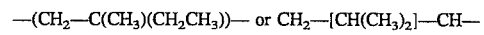

Preferably, the polyalkylene blocks have Mw of at least 125,000, more preferably at least 130,000, especially at least 140,000.

The proportions of ethylene/propylene units incorporated in the polyalkylene blocks may be varied from as low as 20% to 100%, proportions of less than 100% being preferably derived from a mixed isoprene/butadiene feedstock which is copolymerised and hydrogenated to produce the SEPS triblocks having mixed ethylene/propylene: ethylene/butylene polyalkylene blocks. The benefits of the SEPS gels described in the aforementioned pending application are produced by the presence of the ethylene/propylene units, and increasing proportions of at least 30% or 40%, preferably at least 50%, of the ethylene/propylene units are preferred. A particularly preferred SEPS block copolymer for the present purposes has polyalkylene mid-blocks comprising about 60% ethylene/propylene units and about 40% ethylene/butylene units. Higher proportions of ethylene/propylene units, such as 80% and 90%, and single-unit alkylene blocks of 100% ethylene/propylene units are also useful. Proportions are percentages by weight.

It is contemplated that alkylene units other than ethylene/butylene could be incorporated with the ethylene/propylene units to form other useful SEPS block copolymers, but ethylene/butylene is preferred.

Cross-linking of the composition, although not essential, may be effected if desired as described in WO-A-8800603 and EP-A-0224389, and may produce further improvements in properties.

Within the specified range of properties for the gels and gelloids according to this invention, those having an ultimate elongation of at least 200% are preferred. Substantially elastic deformation up to an elongation of at least 200% is also preferred.

The extender liquids useful in the compositions of this invention comprising the block copolymer may be selected from oils conventionally used to extend elastomeric materials. The oil may be hydrocarbon oil such as paraffinic or naphthenic oils, synthetic oils such as polybutene oils, and mixtures thereof. The preferred oils are substantially non-aromatic mixtures of paraffinic and naphthenic hydrocarbons. The oils preferably have a minimum boiling point higher than the softening point of the block copolymer(s) and any additional polymer or copolymer. The extender liquid preferably comprises a substantially non-aromatic paraffinic/naphthenic mineral oil of paraffinic:naphthenic (P:N) carbon ratio within the range from 1.75:1 to 5:1, preferably 1.77:1 to 3:1, more preferably 1.9:1 to 2.7:1, and most preferably 2.2:1 to 2.4: 1, this extender oil being preferred for all the gel compositions herein described. These extender oils, especially at the preferred P:N ratios, tend to produce gels with characteristics especially well suited to the purposes of the aforementioned re-enterable enclosures. Preferably, the oil has a relative density at 20° C. according to ASTM D1298 within the range from 0.861 to 0.865, preferably 0.862 to 0.864. Preferred extender oils include, for example, those available from Fina Chemicals under the Trade Marks "Vestan A360B" (preferred) from Fina, "Drakeol 34" from Penreco, and "Witco 380PO" from Witco.

The compositions of this invention are preferably prepared by mixing the oil with the block copolymer(s) at a temperature not less than the glass transition temperature of the polystyrene blocks of the SEPS block copolymer, as described generally in WO-A-8800603. Mastication or other mixing techniques at lower temperatures, perhaps with the aid of volatile solvents, may however be used if the resulting composition is acceptable for the intended end use.

The compositions according to the various aspects of this invention can be made having a wide range of physical properties, such as dynamic storage modulus, ultimate elongation, and tear strength, to suit particular end use requirements. The preferred compositions having an ultimate elongation of at least 200% (ASTM D412) are particularly useful as sealing materials. The compositions preferably contain more than 500, and preferably not more than 5000, parts by weight of extender liquid per 100 parts by weight of the block copolymer.

It may be useful to use various additives for various purposes in any of the compositions of this invention. Such additives may be stabilisers, antioxidants, flame retardants, tackifiers, corrosion inhibitors and the like. It is useful to use antioxidants in all the compositions of this invention.

The compositions of this invention have numerous uses as elastomeric materials and in particular may be used as sealing materials for electrical connection enclosures, for example as illustrated in published European Patent application 0108518 and 0191609 (the disclosures of which are both incorporated herein by reference), although the compositions of this invention will have many and varied uses depending on the properties desired and the temperatures to be encountered.

Gel or gelloid compositions within the scope of this invention are preferably defined by the criteria (1) to (8) derived from Tests I to V as described in WO-A-8800603, the disclosure of which is incorporated herein by reference, of which criteria preferably not more than one (not (1) or (2)) will be outside the specified ranges.

The preferred SEPS block copolymers for the present invention are selected from those commercially available under the Trade Mark "SEPTON" from Kuraray of Japan, SEPTON 4055 being the aforementioned preferred grade. The presence in a given composition of the required range of properties for optimised gel compositions according to the present invention may be determined by simple trial and error against the aforementioned criteria.

Examples of the SEPS gels according to this invention will now be described in comparison with corresponding SEBS gels made from the known polymer available under the Trade Mark KRATON G1651.

The polymers indicated in the following table were masticated together with the aforementioned Fina Vestan A360B extender oil in a Z-blade mixer for 50 minutes at 195°–210° C. under vacuum.

| Polymer | Mid-block | Mw of polymer | PS content |
| --- | --- | --- | --- |
| Septon 4033 | EP/EB | 97k | 30% |
| Septon 4055 | EP/EB | 308k | 30% |
| Septon 4077 | EP/EB | 392k | 30% |
| Septon 4155 | EP/EB | 290k | 35% |
| Septon 2005 | EP | 257k | 20% |
| Septon "2055" | EP | 250k | 30% |
| Septon 2006 | EP | 251k | 35% |
| Septon 2105 | EP | 275k | 50% |

The weight average molecular weights (Mw) were determined by gel permeation chromatography (GPC) under the following conditions:
Solvent: HPLC grade THF. Flow rate: 1.33 mls/min
Temperature: ambient. Injection volume: 200 microliters
Sample conc.: 0.05% Internal std.: phenyl hexane
Detector: Differential Refractive Index detector
Columns: 2 off 60 cms Polymer Labs. mixed gel - 10 micron.
DATA REDUCTION: Polymer Laboratories Caliber Software.

The samples (100 mg) were accurately weighed and dissolved in 40 mls of THF in 50 ml volumetric flasks. 50 microliters of marker were added then the polymer had dissolved, and the solutions up made to the 50 ml mark, They were then filtered through a 0.2 micrometer pressure filter, and injected into the GPC. Four separate solutions of differing mixtures of polystryene standards were made up in volumeric glassware, and spiked with a known volume of marker.

The marker was used to correct for flow variations. The software created a calibration curve from the mixtures of standards using a third order polynomial fit.

The oil/polymer mixtures containing the percentage by weight of the polymer indicated in following tables were tested for dynamic storage modulus (G'), softening point (Ts), elongation at break (Eb), and tensile strength (T.S.), as follows.

In the TMA softening point test, a weighted piston is placed on top of a gel sample. The sample is then heated, and the deflection of the probe measured as a function of temperature. The trace produced has a flat, linear region (A), followed by a transition (melting) region (B) followed by a second flat region (C) where the piston has reached the limit of its travel. This is shown schematically in the accompanying FIG. 1. The quoted softening point Ts is the temperature where extrapolated straight lines through A and B intersect.

Our method used Du Pont thermomechanical analyser (TMA-942) with a Du Pont 1090 thermal analyser. A 2.54 mm diameter flat-bottomed quartz probe was used with a 2g load. The gel sample was a disc, 6.25mm in diameter and 2mm thick. The sample was equilibrated at −40° C. for 5 minutes, then heated to 300° C. at a rate of 5° C./minute.

Tensile and elongation testing was according to ASTM D412, except that BS 903 Type 2 dumb-bells with a gauge length of 40 mm were used. The pulling speed was 100 mm/minute.

G'(modulus) and tan delta were measured using a Bohlin VOR-melt rheometer and software. The rheometer was used in oscillation mode, with a 25 mm diameter parallel plate measuring system and a 90 gcm torsion bar transducer. Gel samples were 25 mm diameter discs, of thickness 3±0.2 mm. Measurements were made at approximately 23° C., at oscillation frequencies of 0.1 Hz and 1 Hz. The instrument was run at its maximum angular strain, corresponding to a strain of about 6% in these samples.

The oil loss was measured as follows:

Sample discs of gel (15 mm diameter ×3 mm thickness) were supported inside 15 mm diameter holes cut in a metal block. The lower surface of each disc was supported on a fine mesh, to provide free surface for extender loss. A constant pressure of 50 kPa was applied to the top surface by means of a weighted piston. The whole assembly was placed in an oven at 60° C., and the weight loss from each disc monitored with time. The M (infinity) value quoted is the mass of extender lost at equilibrium, expressed as a percentage of the original mass.

The results are shown in the following Table I. Comparison of EB with EP and EP/EB mid-blocks General Properties

TABLE I

| Gel | G'@ 0.1 HZ (kPa) | $T_s$ (°C.) | T.S. (MPa) | E.B. (%) |
|---|---|---|---|---|
| 6% G1651 | 1.08 | 96 | 0.16 | 1074 |
| 6% S2006 | 1.0 | 108 | 0.27 | 1518 |
| 6% S4055 | 1.05 | 110 | 0.24 | 1700 |
| 6% S4155 | 1.66 | 126 | 0.32 | 1420 |
| 12% G1651 | 6.74 | 125 | 0.56 | 1600 |
| 12% S2005 | 4.10 | 131 | 0.46 | 1606 |
| 12% S4055 | 6.67 | 132 | >0.51 | >1800 |
| 12% S4155 | 7.38 | 151 | 0.83 | 1615 |
| 18% G1651 | 15.1 | 142 | 1.10 | 1624 |
| 18% S2006 | 10.7 | 148 | 1.08 | 1802 |
| 18% S4055 | 16.9 | 152 | >1.03 | >1800 |
| 18% S4155 | 17.2 | 163 | 1.93 | 1780 |
| 11:4 G1651/G1701* | 8.10 | 135 | 0.74 | 1650 |
| 11:4 S4055/G1701* | 7.90 | 138 | >0.34 | >1500 |

*KRATON G1701 is a styrene-ethylene/propylene diblock copolymer which improves the oil retention of KRATON G1651 gels as described in our aforementioned copending British Patent Application. This TABLE illustrates that:

Softening points are improved for EP and EP/EB;

Tensile strength and elongation show a general improvement, especially for EP/EB midblocks.

The performance of the gels as sealants is indicated by measurement of tan delta and tack, as follows. Tan delta is measured by the dynamic oscillatory shear test using the aforementioned rheometer, and represents the ratio of the applied energy dispersed by viscous processes to the energy stored in the deformed elastic polymer network. Higher tan delta values indicate an increase in the internal viscous damping within the gel, which manifests itself as improved ability to conform to surfaces with which the gel is brought into contact. When the surface is one which the gel composition can "wet", the result is an increase in tack or adhesion, which may be qualitatively perceived as increased stickiness to touch.

Tack may be measured in terms of the work done in pulling a probe away from a gel sample with which it has been pressed into contact. The equipment used is a Stevens-LFRA Texture Analyser, which is a mechanical device for pushing a probe a fixed distance into a material and subsequently withdrawing it. The probe is attached to a bi-directional load cell, which measures the normal force at the probe surface during the test. Various probes may be used, and the speed and depth of penetration may be controlled by the operator. In the present tests, the gel sample was a moulded slab, 150 mm ×150 mm ×3mm thick. A cylindrical perspex probe, of diameter 25 mm, was pushed end-on into the gel to a depth of 1 mm at a speed of 0.2 mm/sec, and then withdrawn at a speed of 2 mm/sec.

The output from the load cell is directed to a recording device, which may be a chart recorder or a digital computer. In the present case, the data was output to an IBM Personal Computer running software supplied by Stevens. The results are presented as a force (grammes) vs. time (seconds) curve. Because the test is carried out at a constant speed, the area under this curve is equivalent to work (=force times distance).

The resulting force-time curve has a positive part, where the probe is being pushed into the gel, followed by a negative part where the probe is being withdrawn. The area under the negative part of the curve is a measure of the work done in withdrawing the probe, which is approximately equal to the total integrated work of overcoming the adhesion. This "tack area" has units of grammes ×seconds. Higher values correspond to tackier gels.

Due to limitations of the equipment, this test could only be carried out on the softer gels, i.e. up to 12% rubber.

The results, using gels made with the materials and methods previously indicated, are shown in the following Table II.

TABLE II

| Wt % Polymer | Tan Delta G1651 | at 1 Hz S4055 | Tack G1651 | Area (gs) S4055 |
|---|---|---|---|---|
| 6 | 0.08 | 0.23 | 57 | 246 |
| 8 | 0.09 | 0.19 | 168 | 270 |
| 10 | 0.09 | 0.18 | 120 | 324 |
| 12 | 0.09 | 0.16 | 159 | 212 |
| 14 | 0.09 | 0.15 | — | — |
| 16 | 0.08 | 0.14 | — | — |
| 18 | 0.08 | 0.14 | — | — |
| 20 | 0.07 | 0.13 | — | — |

Improvement of compression set

Table III shows compression set measured according to ASTM D395-89 Method B at 70° C. In Table IV, gels including PPO are measured at 90° C. This is because the PPO gels show negligible set at 70° C. The ASTM method specifies 50° C., but most gels show negligible set at this temperature.

TABLE III

| Gel | 70° C. Set Comp. Set (%) |
|---|---|
| 12% G1651 | 42 |
| 12% S2006 | 40 |
| 12% S4055 | 36 |
| 12% S4155 | 28 |

TABLE IV

| Gel | 90° C. Set Comp. Set (%) |
|---|---|
| 12% G1651 | 94 |
| 12% S4055 | 82 |
| 11.7% G1651/2.3% PPO | 20 |
| 11.7% S4155/2.3% PPO | 6 |

This shows that set is improved, particularly with EP/EB mid blocks, and illustrates the beneficial effect of PPO in these gels.

Improved Phase Stability (EP/EB)

$M_{inf}$ values for EP/EB mid-block gels show a clear improvement over EB mid-block gels.

TABLE V

| Gel | $M_{inf}$ (%) |
|---|---|
| 12% G1651 | 28 |
| 12% S4055 | 13 |
| 11:4 G1651/G1701 | 12 |
| 11:4 S4055/G1701 | 3.5 |

Improved low-temperature flexibility (EP)

Comparison of modulus (G'@0.1 Hz) numbers shows the advantage of EP over EB midblocks.

TABLE VI

| Gel | G'@ 0.1 Hz 25° C. (kPa) | G'@ 0.1 Hz −40° C. (kPa) | Ratio −40° C./25° C. |
|---|---|---|---|
| 6% G1651 | 1.08 | 77.5 | 71.7 |
| 6% S2006 | 1.00 | 30.4 | 30.4 |
| 12% G1651 | 6.74 | 77.5 | 11.5 |
| 12% S2006 | 4.10 | 28.0 | 6.8 |
| 18% G1651 | 15.1 | 77.9 | 5.2 |
| 18% S2006 | 10.7 | 37.6 | 3.5 |

Advantages due to molecular weight>180 k.

TABLE VII

| Gel | Mol. Weight | G'@ 0.1 Hz (kPa) | $T_s$ (°C.) | T.S. (MPa) | E.B. (%) |
|---|---|---|---|---|---|
| 12% S4033 | 97k | 10.7 | 54 | 0.04 | 224 |
| 12% S4055 | 308k | 6.67 | 132 | >0.51 | >1800 |
| 12% S4077 | 392k | — | 160 | — | — |

Low molecular weight leads to low tensile strength, ultimate elongation and softening point. All grades were 30% styrene, EP/EB mid-block.

Advantages of selected styrene content

The table compares Septon grades of about equal molecular weight, with EP mid-blocks and differing styrene contents.

TABLE IX

| Gel | Polystyrene (%) | G'@ 0.1 Hz (kPa) | $T_s$ (°C.) | T.S. (MPa) | E.B. (%) |
|---|---|---|---|---|---|
| 12% S2005 | 20 | 4.1 | 84 | 0.26 | 1648 |
| 12% S2006 | 30 | 4.1 | 131 | 0.46 | 1606 |
| 12% S2105 | 50 | 3.4 | 175 | 0.16 | 898 |

Note that poor tensile properties are obtained with both high and low PS contents. Low PS leads to a low softening point. The high PS grade is extremely difficult to process. The low modulus, tensile strength and elongation of the gel made from this sample may reflect the fact the processing this grade without degradation is difficult.

The gels according to the present invention may contain additives compatible with the polystyrene end blocks of the gel copolymer, which raise the softening temperature and other performance characteristics of the gel, for example polyphenylene oxide (PPO) as described in WO-A-8800603. The gels may contain additives which resist migration into the gel of PVC plasticisers from PVC articles with which the gel is in contact use, for example the phosphate additives or other additives described in WO-A-9105014.

The invention also provides devices wherein a body of the gel composition according to this invention forms a seal between two or more surfaces; and devices, preferably enclosures for electrical connections, comprising a body of the present gel composition and means for holding the body of gel composition under compression in use, preferably against and around the connections, so as to form a seal against contamination and/or corrosion.

We claim:

1. A gel composition comprising a styrene-(ethylene/propylene)styrene block copolymer having Mw of at least 180,000 and a polystyrene block content of 25–45 weight percent and at least 300 parts by weight of substantially non-aromatic extender liquid per 100 parts by weight of the block copolymer, which liquid extends and softens the ethylene/propylene polymer blocks of the said copolymer.

2. A composition according to claim 1, wherein the said block copolymer comprises 28 to 40 weight percent of the polystyrene blocks.

3. A composition according to claim 1, wherein the said block copolymer has Mw of at least 200,000.

4. A composition according to claim 1 wherein the ethylene/propylene blocks contain at lest 20% by weight of ethylene/propylene units.

5. A composition according to claim 4, wherein the ethylene/propylene blocks contain ethylene/butylene units and ethylene/propylene units.

6. A composition according to claim 4, wherein the ethylene/propylene blocks contain substantially 100% by weight ethylene/propylene units.

7. A composition according to claim 1, wherein the ethylene/propylene blocks have Mw of at least 125,000.

8. A composition according to claim 1 including polyphenylene oxide.

9. A composition according to claim 1 including a styrene-alkylene diblock copolymer which reduces loss of extender liquid from the composition.

10. A composition according to claim 1, wherein the poly(ethylene/propylene) blocks predominantly comprise units of formula

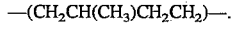

11. A composition according to claim 1 wherein the extender liquid comprises a paraffin/naphthene mineral oil of paraffin:napththene ratio within the range from 1.75:1 to 5:1.

12. A composition according to claim 1 comprising at least 500, parts by weight of the extender liquid per 100 parts by weight of the said copolymer.

13. A composition according to claim 1, having an ultimate elongation greater than 100% with substantially elastic deformation to an elongation of at least 100%.

14. A composition according to claim 1 having ultimate tensile strength less than 1 MPa.

15. A composition according to claim 1 having a dynamic storage modulus G' less than 50000 Pa at 0.1 Hz.

16. A composition according to claim 1 comprising 4 to 20 weight percent of the said block copolymer.

17. A device comprising a body of a gel composition which comprises a styrene-(ethylene/propylene)-styrene block copolymer having Mw of at least 180,000 and a polystyrene block content of 25–45 weight percent and at least 300 parts by weight of substantially non-aromatic extender liquid per 100 parts by weight of the block copolymer, which liquid extends and softens the ethylene/propylene polymer blocks of the said copolymer and means for holding the body of gel composition under compression in use so as to form a seal against contamination and/or corrosion.

18. A device comprising a body of a gel composition which comprises a styrene-(ethylene/propylene)-styrene block copolymer having Mw of at least 180,000 and a polystyrene block content of 25–45 weight percent and at least 300 parts by weight of substantially non-aromatic extender liquid per 100 parts by weight of the block copolymer, which liquid extends and softens the ethylene/propylene polymer blocks of the said copolymer and wherein the gel forms a seal between two or more surfaces.

19. A composition according to claim 1 comprising not more than 5,000 parts by weight of the extender liquid per 100 parts by weight of the block copolymer.

\* \* \* \* \*